(12) United States Patent
Trujillo

(10) Patent No.: US 12,259,088 B2
(45) Date of Patent: Mar. 25, 2025

(54) CEILING MOUNT SUPPORT TOOL FOR TEMPORARILY HOLDING AN ELECTRICAL DEVICE TO A CEILING BRACKET

(71) Applicant: Eduardo J Trujillo, Liberty Hill, TX (US)

(72) Inventor: Eduardo J Trujillo, Liberty Hill, TX (US)

(*) Notice: Subject to any disclaimer, the term of this patent is extended or adjusted under 35 U.S.C. 154(b) by 0 days.

(21) Appl. No.: 18/675,434

(22) Filed: May 28, 2024

(65) Prior Publication Data

US 2024/0309992 A1 Sep. 19, 2024

Related U.S. Application Data

(62) Division of application No. 18/314,599, filed on May 9, 2023, now Pat. No. 12,025,264.

(60) Provisional application No. 63/441,008, filed on Jan. 25, 2023.

(51) Int. Cl.
*F16M 13/02* (2006.01)
*F16C 11/06* (2006.01)

(52) U.S. Cl.
CPC ....... *F16M 13/027* (2013.01); *F16C 11/0604* (2013.01); *Y10T 29/4978* (2015.01); *Y10T 29/49826* (2015.01)

(58) Field of Classification Search
CPC .................................................. F16M 13/027
See application file for complete search history.

(56) References Cited

U.S. PATENT DOCUMENTS

| 5,292,228 | A | * | 3/1994 | Dye | F04D 25/08 |
| | | | | | D23/385 |
| 7,267,314 | B1 | * | 9/2007 | Erickson | F16M 13/02 |
| | | | | | 248/323 |
| 2006/0255226 | A1 | * | 11/2006 | Frampton | F16M 13/027 |
| | | | | | 248/343 |
| 2011/0052411 | A1 | * | 3/2011 | Yamamoto | F04D 25/08 |
| | | | | | 416/244 R |

* cited by examiner

*Primary Examiner* — Sarang Afzali
(74) *Attorney, Agent, or Firm* — Barry Choobin; Patent 360

(57) ABSTRACT

A ceiling mount support tool for temporarily mounting an electrical device, such as a ceiling fan to a ceiling bracket. The ceiling mount support tool has a shaft, a ball joint at the proximal end of the shaft, and a socket at the distal end of the shaft. The ceiling mount support tool is mounted to a ceiling flange, and the ceiling fan is mounted to the ceiling mount support tool. Thereafter, electrical wires can be connected, and then the ceiling fan and the ceiling mount support tool can be removed. The ceiling fan with the wires connected can then be mounted to the ceiling bracket.

4 Claims, 7 Drawing Sheets

CEILING MOUNT SUPPORT TOOL FOR TEMPORARILY HOLDING AN ELECTRICAL DEVICE TO A CEILING BRACKET

CROSS-REFERENCE TO RELATED APPLICATIONS

This application is a continuation of a U.S. Pat. No. 12,025,264 corresponding to the U.S. patent application Ser. No. 18/314,599 filed on May 9, 2023, which claims priority from a U.S. Patent Appl. Ser. No. 63/441,008, filed on Jan. 25, 2023, the disclosure of both are hereby incorporated by reference in its entirety.

FIELD OF INVENTION

The present invention relates to a tool for mounting an object to a ceiling surface, and more particularly, the present invention relates to a tool for supporting a ceiling fan.

BACKGROUND

Installing a ceiling fan is a laborious task, typically requiring the help of a second person for installation, such that to complete the task efficiently. The ceiling fan must be held near the ceiling bracket while connecting the electrical wires. Typically, one person is required to hold the weight of the fan assembly in place, while the other person connects all the electrical wires of the assembly to the house wires coming out of the ceiling. The fan assembly can be heavy and thus tiring for the person to hold at ceiling height. Moreover, for two people, two ladders or a centralized elevated walkway may be required. One person needs to hold the fan assembly in place, the fan assembly of a weight ranging from 15 lbs. to 25 lbs., during the entire connection process. Assuming no parts or tools are dropped or fall to the ground, the person connecting the wires will need to have all the necessary tools and wiring parts with them; otherwise, they will have to go up and down the ladder multiple times to collect the needed items.

Many times, the help of a second person may not be available. A need is therefore appreciated for a tool that can support the ceiling fan while a person connects the electrical wires without the need for a person to hold the ceiling fan.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a ceiling mount support tool for temporarily supporting an object from a ceiling.

It is another object of the present invention that the ceiling mount support tool allows a single person to install the ceiling fan.

It is still another object of the present invention that the ceiling mount support tool saves a person from the hardship of holding a ceiling fan at a height.

It is yet another object of the present invention that the ceiling mount support tool allows the ceiling fan to be securely and safely mounted.

In one aspect, disclosed is a ceiling mount support tool that can help install a ceiling fan. The disclosed ceiling mount support tool can hold the weight of the fan assembly or any other object having a ball-and-socket joint securely in place from the ceiling, allowing an individual installer to install the ceiling fan without the help of a second person or holding the fan assembly in hand while connecting the wires. The disclosed tool can mount the ceiling fan while both hands of the installer are free for connecting the wires or any other pre-mounting task. The disclosed tool can hold the fan assembly securely in place while the tool can be mounted to a ceiling bracket and still provide enough space between the fan assembly and the ceiling bracket to allow the individual installer to connect the electrical wires easily. If the installer drops an assembly part or requires additional tools or parts, the installer can walk away from the fan assembly, since it is securely held in place until it is ready for mounting to the ceiling mount.

In one aspect, the disclosed system has an advantage for the installer: the ability to complete the installation of a typical ball-and-socket joint fan assembly or other electrical assemblies to a ceiling bracket without needing the assistance of a second person to hold the fan assembly, while the electrical wires are connected, and any other pre-mounting tasks are completed.

In one aspect, a ceiling fan can be installed by a single person, wherein the person can descend if required while the ceiling fan remains secured to the disclosed tool.

In one aspect, disclosed is a means for temporarily securing a fan assembly to a fan ceiling bracket mounted to a ceiling and holding it in place while providing enough space between the ceiling bracket and the fan assembly, for connecting the electrical wires of the fan assembly, allowing an individual installer the ability to use both hands to connect the fan assembly wires to the house electrical wire.

In one aspect, disclosed is a tool that can be used for temporarily suspending fan assemblies and light fixtures from the ceiling, regardless of whether they have an extended shaft or no extension shaft. The disclosed tool can be used to temporarily hang any electrical device having a ball-and-socket joint mechanism from the ceiling, providing a good amount of space between the ceiling and the electrical device for wiring and any other pre-mounting task.

In one aspect, the disclosed tool can be manufactured in different sizes and with different strengths for different objects.

In one aspect, the disclosed tool can be versatile enough to allow an individual installer to connect the fan assembly wires or perform any other installation tasks without obstructing their vision or ability to complete the tasks before mounting the fan assembly to the fan ceiling mount on the ceiling of the room or structure.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
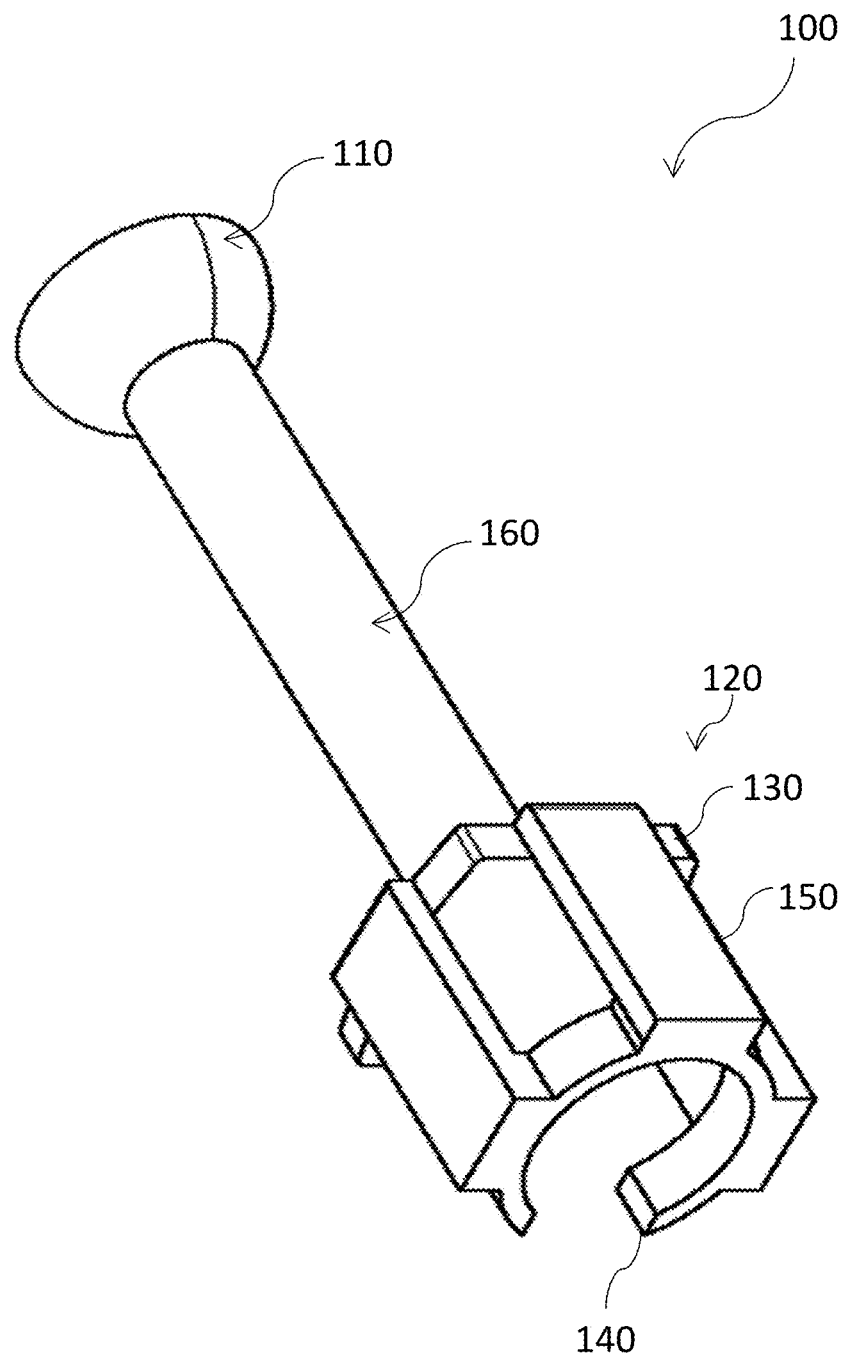
FIG. 1 is a bottom-back perspective view of a ceiling mount support tool, according to an exemplary embodiment of the present invention.
Figure 2:
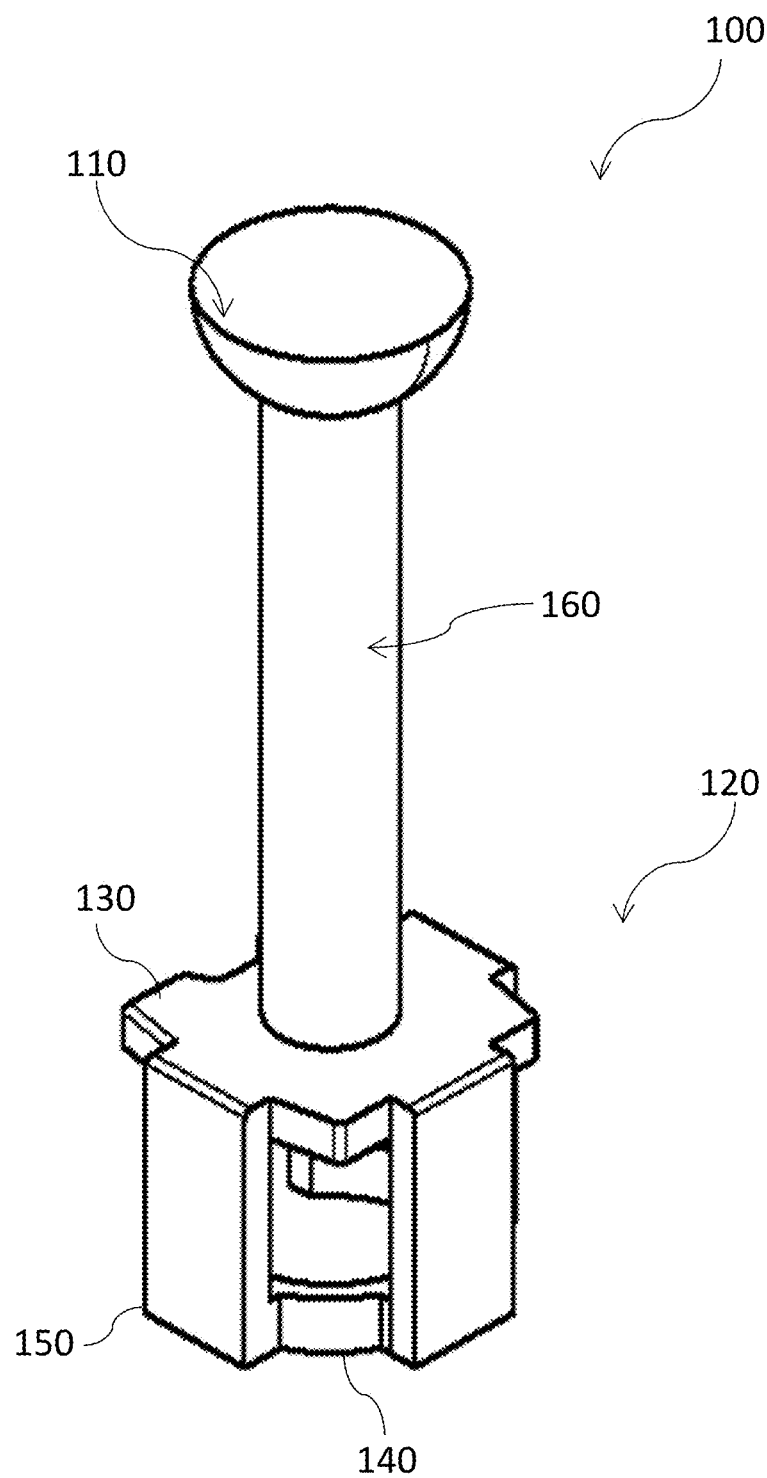
FIG. 2 is a top and back quarter view of the ceiling mount support tool, according to an exemplary embodiment of the present invention.
Figure 3:
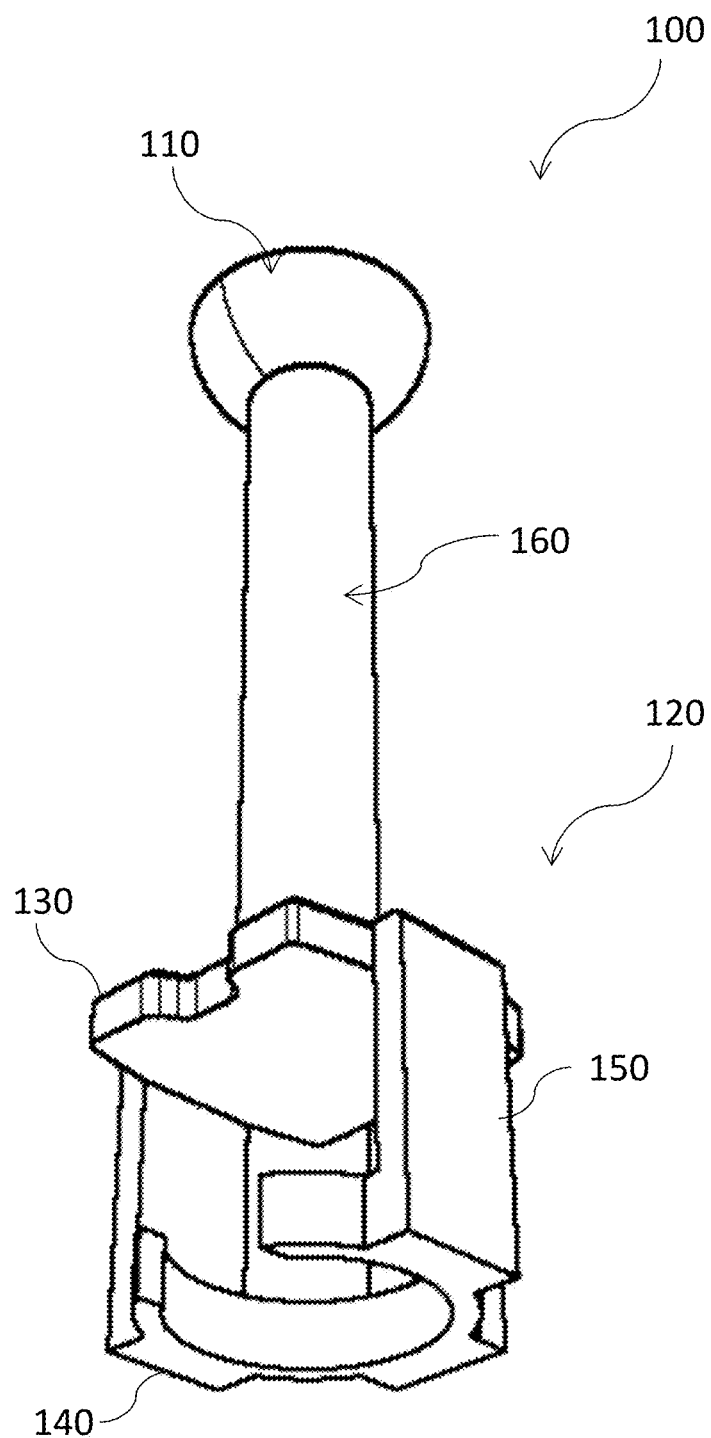
FIG. 3 is a bottom-front quarter view of the ceiling mount support tool, according to an exemplary embodiment of the present invention.
Figure 4:
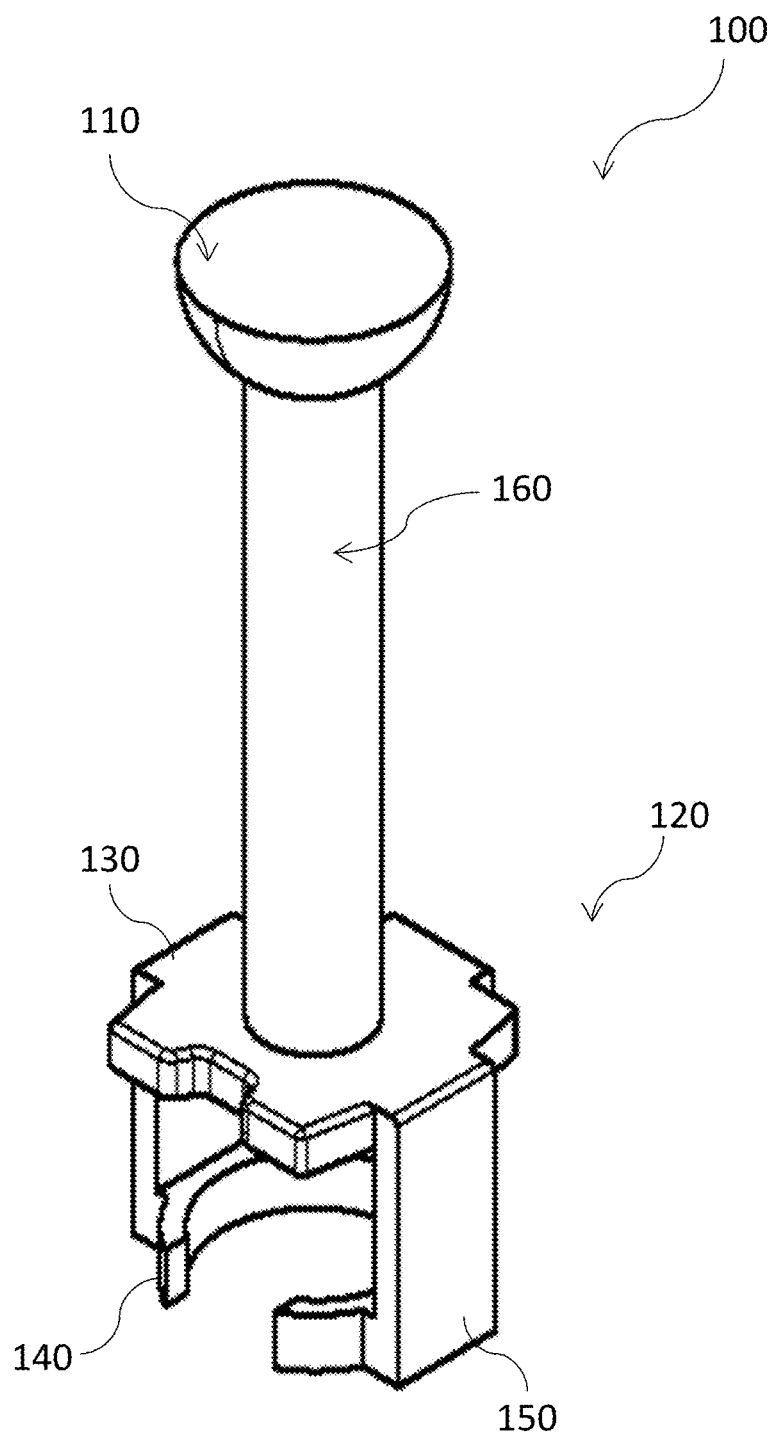
FIG. 4 is a top front quarter view of the ceiling mount support tool, according to an exemplary embodiment of the present invention.

The subject matter will now be described more fully hereinafter with reference to the accompanying drawings, which form a part hereof, and which show, by way of illustration, specific exemplary embodiments. Subject matter may, however, be embodied in a variety of different forms, and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting of embodiments of the invention. As used herein, the singular forms "a", "an", and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a ceiling mount support tool that is intended to provide an easy and reliable means to securely hold the weight of a ceiling fan assembly, or any other ball-and-socket based electrical assembly to a ceiling mount. The ceiling fan assembly can be temporarily mounted to the ceiling mount support tool to make electrical wire connections or complete any other pre-mounting tasks prior to mounting the assembly to the ceiling mount.

Referring to FIGS. 1-4 show an exemplary embodiment of the ceiling mount support tool 100. The ceiling mount support tool 100 includes a ball joint 110, a socket 120, and a shaft 160 that extends between the ball joint 110 and the socket 120. The disclosed ceiling mount support tool 100 can act as a temporary extender that holds a ceiling fan to a ceiling bracket which can be a standard bracket for mounting a ceiling fan. The disclosed tool can be used to mount any object to a ceiling that uses a ball-and-socket coupling mechanism. To the ceiling can be mounted a bracket that has a socket, to which an object, such as a ceiling fan can be mounted.

The ball joint 110 of the tool 100 can be mounted to a standard ceiling bracket installed in the ceiling. The ball of the ceiling fan can be mounted to the socket 120 of the tool 100. The length of the shaft is such that when the ceiling mount support tool 100 is mounted to the ceiling bracket and the ceiling fan is mounted to the ceiling mount support tool 100, a person can easily connect the wires of the ceiling fan to the electrical wires from the housing. There may be enough space between the ceiling bracket and the ceiling fan assembly for proper visualization and hand movement while connecting the wires. It is understood, however, that the shaft of variable length is within the scope of the present invention. Suitable means can be included to vary the length of the shaft. For example, the shaft can be made from telescoping tubes that allow for varying the length of the shaft. The shaft can include tubular members that can be fastened together to increase the length of the shaft. For example, two tubular members of the shaft can be threadedly coupled.

The ball joint 110 of the tool 100 can be of a half-sphere profile with a flat top. The ball joint 110 of the tool 100 can be of a profile similar to a ball of a ball-and-socket mechanism. The ball joint 110 can be received into a standard ceiling bracket of the ceiling that has a socket. The standard ceiling brackets are known in the art and are used to mount the ceiling fan and like. The socket 120 on the bottom end of the tool 100 can securely receive the ball of the ball-and-socket joint mechanism. For example, socket 120 can receive the ball of the ceiling fan for mounting the ceiling fan to the disclosed tool 100. The ceiling mount support tool 100 can allow a fan to swivel as needed while functioning.

The ceiling mount support tool 100 can be constructed from durable materials, such as plastic and metal. Preferably, the material can be light in weight that can take the weight of the object, such as the ceiling fan.

In certain implementations, the shaft can be about six inches in length, such as 4-7 inches, and about one inch in diameter. The socket 120 of the tool 100 can have a top plate 130 and a bottom plate 140. The top plate can be plain, while the bottom plate can be hollow with a cutout on the front side of the bottom plate. The bottom plate can form a socket wherein the shaft and ball of the ceiling fan can be inserted through the cutout of the bottom plate and retained within the hole in the bottom plate. Three support bars 150 extend between the top plate 130 and the bottom plate 140. The top plate and the bottom plate can be at a predetermined distance from each other and proportional to the length of the support bars.

Figure 5:
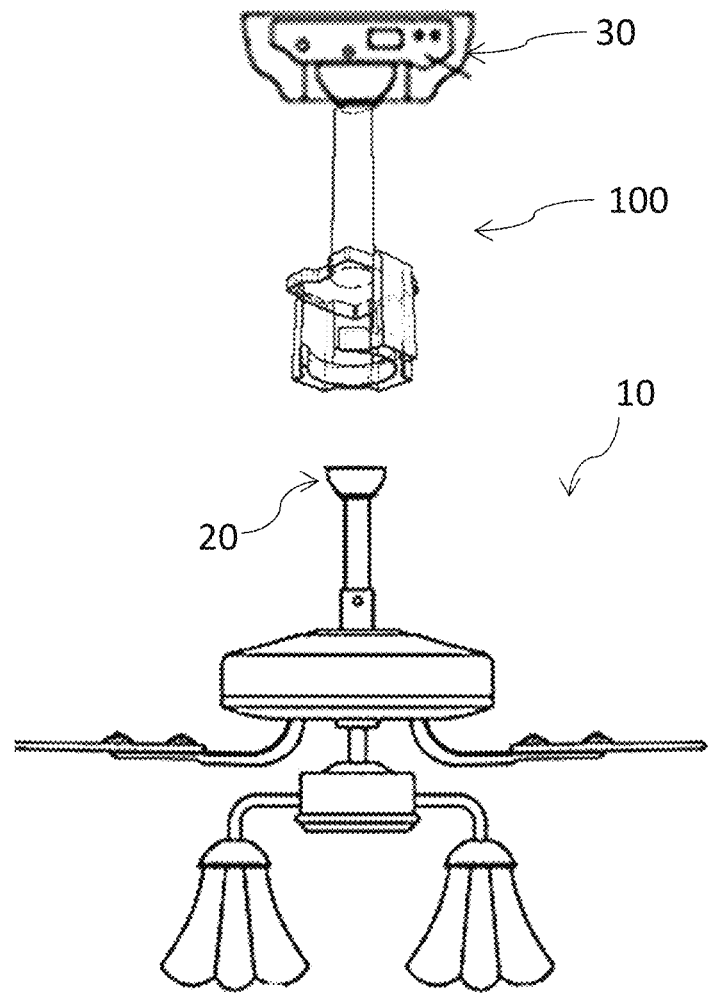
FIG. 5 illustrates the ceiling mount support tool inserted into the ceiling mount along with its relationship to the fan assembly when in use, according to an exemplary embodiment of the present invention.
Figure 6:
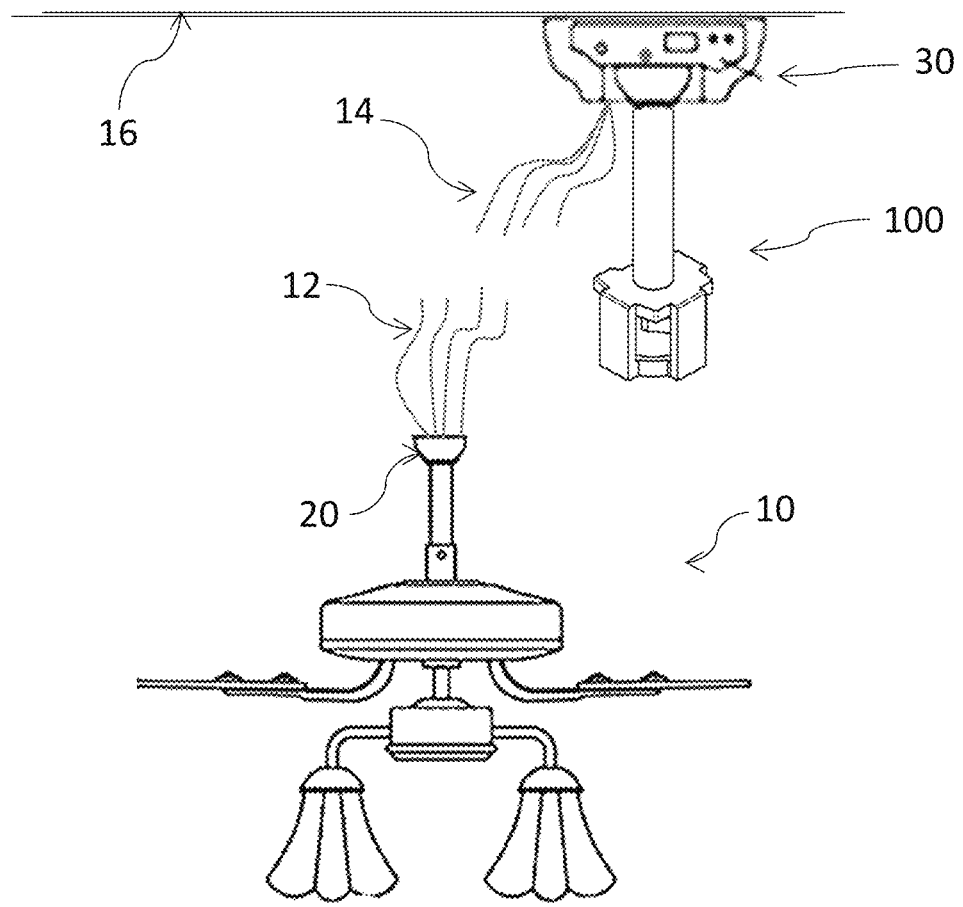
FIG. 6 illustrates the ceiling mount support tool inserted into the ceiling mount along with the electrical wires to be connected to the fan assembly when it is inserted into the invention, according to an exemplary embodiment of the present invention.

Referring to FIGS. 5 and 6 illustrate the mounting of the fan 10 to the ceiling bracket 30 mounted to a ceiling surface 16 using the disclosed tool 100. The person installing a ceiling fan can first install a standard ceiling bracket for the ceiling fan if one is not already present. Thereafter, the ball joint 110 of the tool 100 can be secured to the ceiling bracket 30, wherein the ball joint of the tool can be secured within the socket of the ceiling bracket 30. Once the tool is mounted to the ceiling bracket, the person can then mount the ceiling fan 10 to the tool 100. The ball of the ceiling fan 10 can be mounted into the socket 120 of the tool 100. The ceiling fan can safely hang from the tool, while both hands of the person can be free to connect the electrical wires 12 of the fan and electrical wires 14 from the power supply. Any of the pre-mounting tasks, such as connecting the fan electrical wires to the house electrical wires, can be completed while the fan assembly is safely supported by the tool. Upon completing the pre-mounting tasks, the fan can be removed from the tool. Thereafter, the tool can be removed from the bracket, and then the fan can be secured to the bracket.

Figure 7:
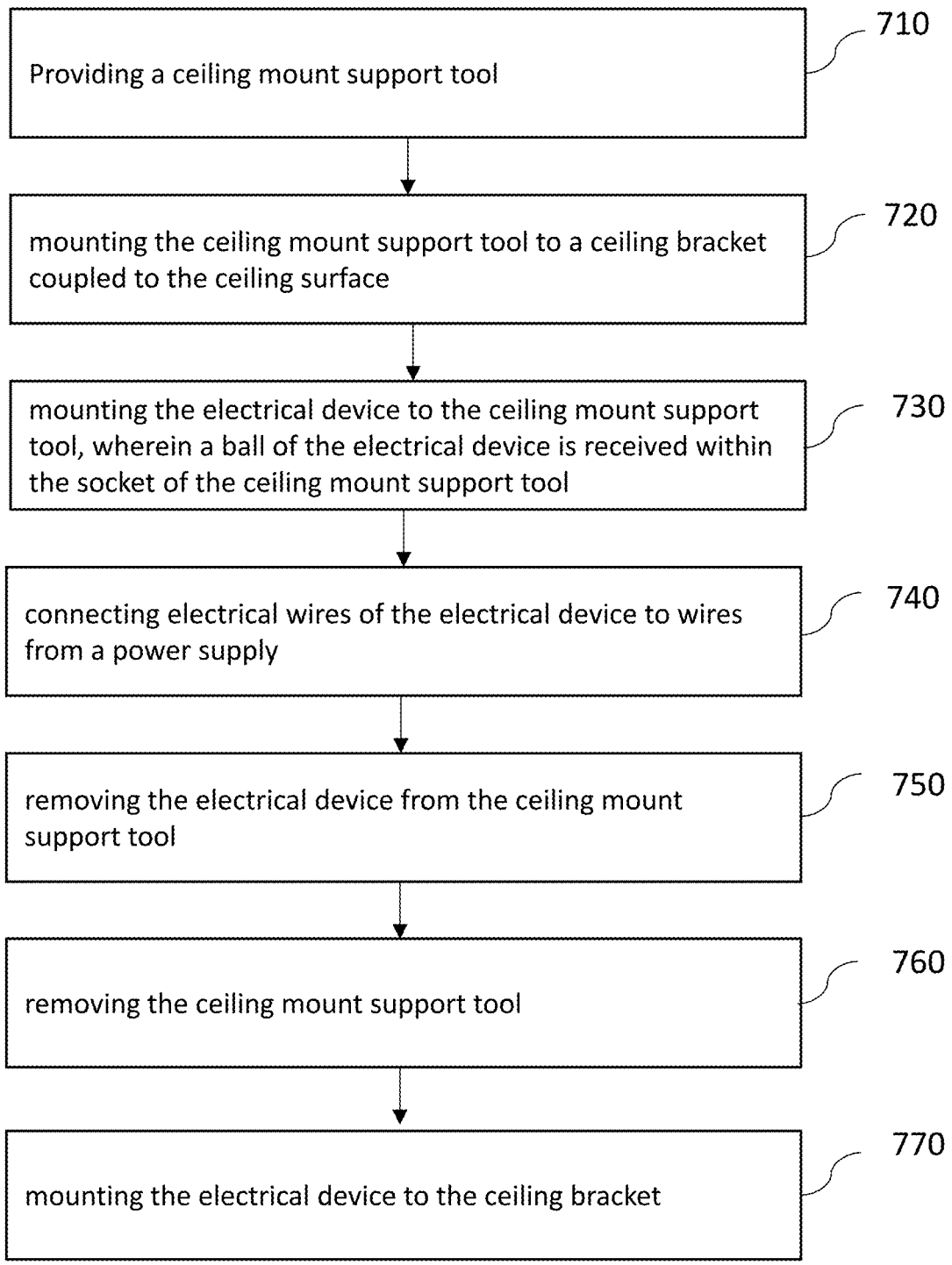
FIG. 7 is a flowchart illustrating the steps of the method, according to an exemplary embodiment of the present invention.

Referring to FIG. 7 which shows a method for installing an electronic device, such as an electric fan. The method includes providing a ceiling mount support tool, at step 710; mounting the ceiling mount support tool to a ceiling bracket coupled to the ceiling surface, at step 720; mounting the electrical device to the ceiling mount support tool, wherein a ball of the electrical device is received within the socket of the ceiling mount support tool, at step 730; connecting electrical wires of the electrical device to wires from a power supply, at step 740; removing the electrical device from the ceiling mount support tool, at step 750; removing the ceiling mount support tool, at step 760; and mounting the electrical device to the ceiling bracket, at step 770.

Some modifications and other embodiments of the invention set forth herein will come to mind to one skilled in the art to which this invention pertains having the benefit of the teachings presented in the previous descriptions and the associated drawings. Therefore, it is to be understood that this invention is not to be limited to the specific examples of the embodiments disclosed and that modifications and other embodiments are intended to be included within the scope of the appended claims. Although specific terms are employed herein, they are used in a generic and descriptive sense only and not for purposes of limitation.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A ceiling mount support tool for temporarily holding an electrical device to a ceiling bracket mounted to a ceiling, the ceiling mount support tool consisting of:
    a shaft having a proximal end and a distal end;
    a ball joint at the proximal end of the shaft, the ball joint is of a hemisphere shape; and
    a socket at the distal end of the shaft, wherein the socket consists of:
    a top plate;
    a bottom plate, the bottom plate has a pass-through aperture in a central portion of the bottom plate, wherein the pass-through aperture extends to a front side of the bottom plate in a form of a cutout; and
    a plurality of support bars extend between the top plate and the bottom plate,
    wherein the pass-through aperture in the bottom plate is configured to receive a shaft of the electrical device through the cutout on the front side of the bottom plate and retain a ball joint coupled to the shaft of the electrical device,
    wherein the socket is configured to retain the ball joint of the electrical device on the bottom plate and below the top plate,
    wherein the plurality of support bars consists of three support bars wherein the three bars are positioned on left, rear, and right sides of the bottom plate and the top plate, wherein the top plate is flat, and the shaft of the ceiling mount support tool extends vertically from a central portion of the top plate, the bottom plate is flat,
    wherein the ceiling mount support tool is configured to be removed in order for the electrical device to be mounted to the ceiling bracket.

2. The ceiling mount support tool of claim 1, wherein the electrical device is a ceiling fan.

3. The ceiling mount support tool of claim 1, wherein the electrical device is a ceiling light.

4. The ceiling mount support tool of claim 1, wherein the shaft comprises a plurality of telescoping tubes configured for varying a length of the shaft.

\* \* \* \* \*